United States Patent
Edelmann et al.

(10) Patent No.: US 9,231,303 B2
(45) Date of Patent: Jan. 5, 2016

(54) COMPRESSIVE BEAMFORMING

(71) Applicants: Geoffrey F. Edelmann, Alexandria, VA (US); Charles F. Gaumond, Accokeek, MD (US)

(72) Inventors: Geoffrey F. Edelmann, Alexandria, VA (US); Charles F. Gaumond, Accokeek, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 416 days.

(21) Appl. No.: 13/915,670

(22) Filed: Jun. 12, 2013

(65) Prior Publication Data

US 2013/0335270 A1      Dec. 19, 2013

Related U.S. Application Data

(60) Provisional application No. 61/659,062, filed on Jun. 13, 2012.

(51) Int. Cl.
| | | |
|---|---|---|
| *H01Q 3/00* | (2006.01) | |
| *H01Q 3/34* | (2006.01) | |
| *G01S 3/802* | (2006.01) | |
| *G10K 11/34* | (2006.01) | |

(52) U.S. Cl.
CPC ........ *H01Q 3/34* (2013.01); *G01S 3/802* (2013.01); *G10K 11/341* (2013.01); *G10K 2200/10* (2013.01); *G10K 2200/11* (2013.01)

(58) Field of Classification Search
CPC .............. H01Q 3/26; H01Q 3/36; H01Q 3/40
USPC ........................ 342/81, 157, 196, 372, 373
See application file for complete search history.

(56) References Cited

U.S. PATENT DOCUMENTS

| | | | |
|---|---|---|---|
| 4,060,792 A | 11/1977 | van Heyningen | |
| 4,112,430 A | 9/1978 | Ladstatter | |
| 4,170,766 A | 10/1979 | Pridham et al. | |
| 4,559,605 A | 12/1985 | Norsworthy | |
| 5,339,281 A | 8/1994 | Narendra et al. | |

(Continued)

OTHER PUBLICATIONS

A. B. Baggeroer et al., "Passive sonar limits upon nulling multiple moving ships with large aperture arrays," Conference Record of the Thirty-Third Asilomar Conference on Signals, Systems, and Computers, 1999.

(Continued)

*Primary Examiner* — Dao Phan
(74) *Attorney, Agent, or Firm* — US Naval Research Laboratory; Suresh Koshy

(57) ABSTRACT

A method of antenna array processing. Digitized time-series data from a plurality of antenna elements are divided into a plurality of time windows. A Fourier Transform is performed on a time window of the plurality of time windows for each antenna element of the plurality of antenna elements to generate a plurality of frequency domain vectors. The plurality of antenna elements is divided into a plurality of largest aperture sub-arrays. The frequency domain vectors are compressive beamformed tor the each sub-array to generate a plurality of bearing estimates corresponding to the plurality of sub-arrays. The plurality of bearing estimates from the plurality of sub-arrays are sparsely combined to generate a plurality of frequency-specific bearing estimates. The plurality of frequency-specific bearing estimates are incoherently averaged over a range of frequencies to generate a bearing for a bearing-timing record. A plurality of bearings for the bearing-timing record is generated.

20 Claims, 1 Drawing Sheet

(56) References Cited

U.S. PATENT DOCUMENTS 6,366,895 B1    4/2002    Woodsum et al.
7,228,236 B2    6/2007    Barnard et al.

OTHER PUBLICATIONS

Emmanuel J. Candès et al., "Robust Uncertainty Principles: Exact Signal Reconstruction From Highly Incomplete Frequency Information," IEEE Transactions on Information Theory, vol. 52, No. 2, Feb. 2006.

Emmanuel J. Candes et al., "Near-Optimal Signal Recovery From Random Projections: Universal Encoding Strategies?," IEEE Transactions on Information Theory, vol. 52, No. 12, Dec. 2006.

J. Capon, "High-Resolution Frequency-Wavenumber Spectrum Analysis," Proc. IEEE, vol. 57, No. 8, Aug. 1969.

Henry Cox et al., "Robust Adaptive Beamforming," IEEE Transactions on Acoustics, Speech and Signal Processing, vol. ASSP-35, No. 10, 1987.

Junfeng Yang et al., "Alternating Direction Algorithms for /1-Problems in Compressive Sensing", arXiv:0912.1185, Dec. 7, 2009.

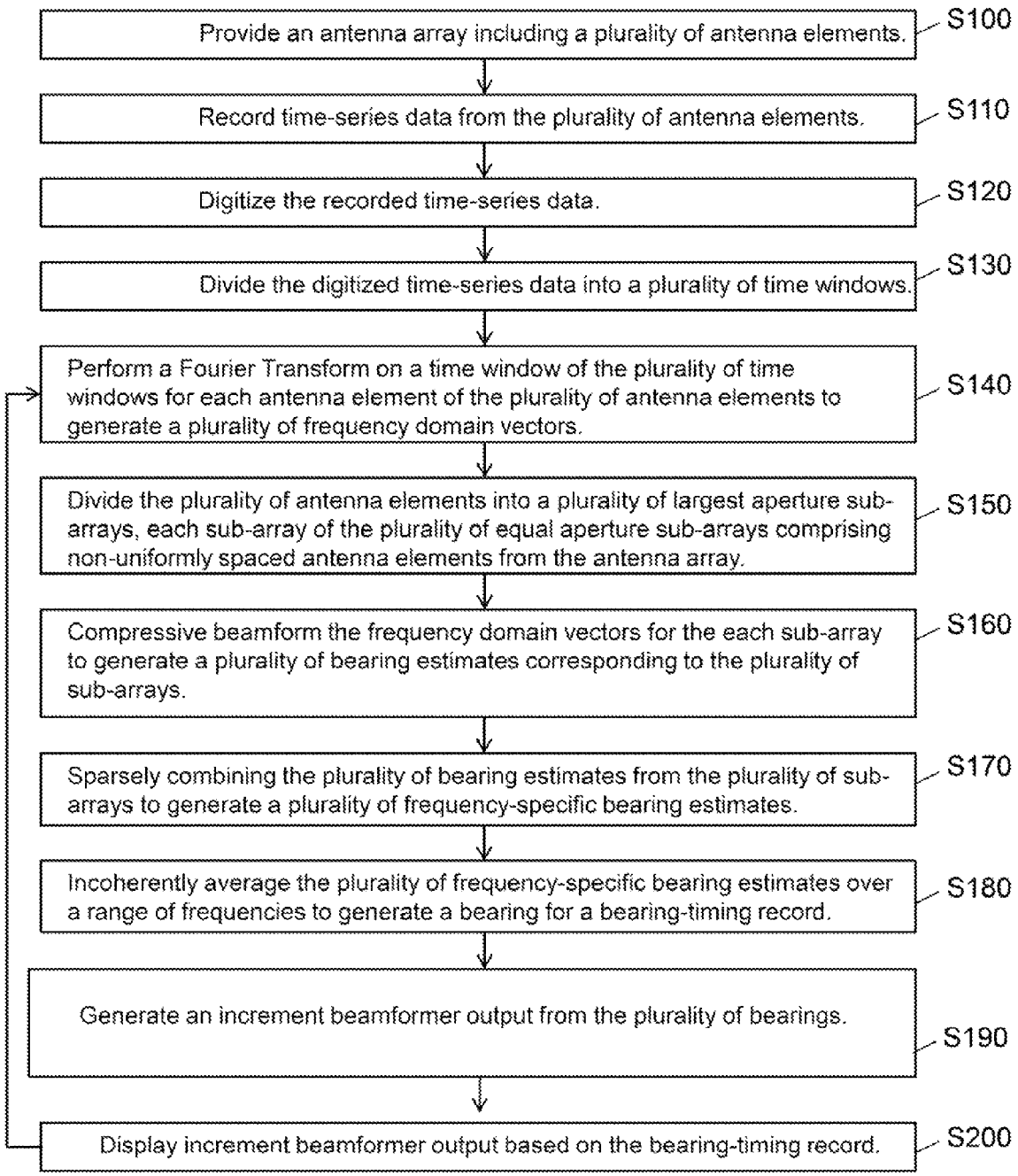

COMPRESSIVE BEAMFORMING

CROSS-REFERENCE TO RELATED APPLICATIONS

The present application claims priority to U S. Provisional Patent Application Ser. No. 61/659,062, filed 13 Jun. 2012.

FIELD OF THE INVENTION

The invention relates generally to a method of target detection, and more particularly to a method of target detection using antenna array processing underwater in an environment exhibiting non-uniform noise.

BACKGROUND OF THE INVENTION

Beamforming has achieved wide success in passive sonar applications such as the detection and localization of sound sources. Plane-wave acoustic beamforming is commonly applied to ship-towed horizontal arrays, where it is used to detect targets, determine target bearing angle, and to enhance signal-to-noise ratio. Specifically, it is a technique for the estimation of the spatial Fourier wave-number spectrum from measurements of a spatially varying acoustic field. Discrete peaks in the spectrum are associated with sources of sound localized in space. However, beamforming is a conventional $l_2$ technique and requires that measurements be properly sampled; i.e., the array must have at least twice as man samples as the highest wavenumber in order to prevent aliasing. In practice, this means that sensing arrays must have many receivers, and that the receivers must be periodically spaced for beamforming to perform well. Thus, arrays are expensive and are compromised by damage to individual receivers.

BRIEF SUMMARY OF THE INVENTION

An embodiment of the invention includes a method of antenna array processing in an underwater environment exhibiting non-uniform noise. An antenna array including a plurality of antenna elements is provided. Adjacent antenna elements of the plurality of antenna elements are uniformly or non-uniformly spaced along the antenna array. Time-series data from the plurality of antenna elements are recorded. The recorded time-series data are digitized. The digitized time-series data are divided into a plurality of time windows. A Fourier Transform is performed on a time window of the plurality of time windows for each antenna element of the plurality of antenna elements to generate a plurality of frequency domain vectors. The plurality of antenna elements is divided into a plurality of largest aperture sub-arrays, each sub-array of the plurality of equal aperture sub-arrays including non-uniformly spaced antenna elements from the antenna array. The frequency domain vectors are compressive beamformed for the each sub-array to generate a plurality of bearing estimates corresponding to the plurality of sub-arrays. The plurality of bearing estimates from the plurality of sub-arrays are sparsely combined to generate a plurality of frequency-specific bearing estimates. The plurality of frequency-specific bearing estimates are incoherently averaged over a range of frequencies to generate a bearing for a bearing-timing record. The performing a Fourier Transform on a time window, the dividing the plurality of antenna elements, the compressive beamforming the frequency domain vectors, and the incoherently averaging the plurality of frequency-specific bearing estimates are repeated to generate a plurality of bearings for the bearing-timing record. Beamformer output is displayed based on the bearing-timing record.

Optionally, the plurality of largest aperture sub-arrays satisfy the Uniform Uncertainty Principle.

Optionally, compressive beamforming includes beamforming free of a covariance matrix.

The beamforming free of a covariance matrix includes solving for a plurality of bearing angles using an l1 matrix inversion.

Optionally, solving for a plurality of bearing angles using an l1 inversion includes using a relaxation algorithm or a greedy algorithm.

Optionally, beamforming free of a covariance matrix includes solving for a plurality of bearing angles using an l1 matrix inversion and an l2 constraint.

Optionally, this method embodiment further includes tracking at least one target using the displayed beamformer output. Optionally, this method embodiment further includes classifying the at least one target based on the beamformer output.

Optionally, the antenna array is a ship-towed, a horizontal array, a vertical array, a moored array, a conformal array, or a hull array.

Optionally, sparsely combining the plurality of bearing estimates for the plurality of sub-arrays includes selecting a plurality of minimum bearing estimates corresponding to a plurality of angles across a plurality of frequencies.

In another embodiment of the invention, compressive sensing is used to exactly reconstruct a sparse signal with fewer measurements than would be expected from traditional sampling theory. Compressive sensing is applied to beamforming measured underwater acoustic data that is sufficiently sparse in bearing angle. This embodiment improves visibility of lines in bearing-time displays for ocean detection problems. Compared with conventional beamforming, compressive sensing according to the instant invention shows finer angular resolution and greater sidelobe and noise suppression when applied to measured at-sea data. Furthermore, the technique is demonstrated to work on a sub-sampled array with no loss in signal-to-interference ratio performance, even with a number of elements that would equivalently produce a three-wavelength spaced array (conventionally half wavelength). Therefore, the inventive method allows the use of arrays with dead hydrophones or allows the possibility of acoustic arrays to he manufactured with fewer elements.

BRIEF DESCRIPTION OF THE DRAWINGS

FIG. is a flow chart of an illustrative method embodiment of the instant invention.

DETAILED DESCRIPTION OF THE INVENTION

Applicants applied a compressive sensing technique to bearing estimation using, for example, a towed array and have determined that compressive sensing provides better estimates of target wavenumbers (i.e., bearings) while only requiring approximately one eighth of the number of measured samples as conventional techniques in at least one embodiment of the invention.

In compressive sensing theory, $l_1$-minimization has been shown to be an efficient method to exactly reconstruct the sparsest solution to underdetermined problems of linear equations. On considering the application of compressive sensing to target detection, Applicants first assumed that there exists an unknown signal of interest $x_0 \in R^N$. The signal is sparse. That is the signal has only a few values that are significantly larger than the rest. Applicants realized that it is possible to generate a vector of measured data y∈$R^M$, via the linear projection Ax=y, where the sensing matrix A is chosen such that it has rank M and dimension M<N, where N is number of look directions. Unlike conventional $l_2$ techniques, Applicants appreciated that this problem can be solved even though the measurements in y are fewer than the dimension of x, where $x_0$ is sufficiently sparse—namely that the number of samples of x is less than K, where K<<M. The sparsity-sensing properties of this technique have made it ideal for such applications as bandwidth compression, image recovery, and signal recovery. In an embodiment of the instant invention, a standard alternating direction algorithm is used to solve this convex optimization problem. An illustrative description of a standard alternating direction algorithm can be found in YANG, J. et al., Alternating direction algorithms for l1-problems in compressive sensing. TR09-37, Rice University, Houston, (2010), a copy of which can be found at http;//arxiv,org/abs/0912.1185 and is incorporated herein by reference. As an example of an alternating direction algorithm, the YALL1 algorithm produces repeatable inversions for beamforming using compressive sensing. An illustrative description of the YALL1 algorithm can be found at Zhang, Y. (2011) YALL1: Your algorithm for L1, an open-source copy of which can be downloaded at http://yall1.blogs.rice.edu/.

An embodiment of the invention is described with reference to FIG. 1. This embodiment includes a method of antenna array processing in an underwater environment exhibiting non-uniform noise. A standard antenna array including a plurality of standard antenna elements is provided, as in Step S100. Adjacent antenna elements of the plurality of antenna elements are uniformly or non-uniformly spaced along the antenna array. An example of an antenna array with non-uniformly spaced antenna elements include an antenna array with defective, broken, or otherwise non-functioning antenna elements. Time-series data from the plurality of antenna elements are recorded, as in Step S110. The recorded time-series data are digitized, as in Step S120. The digitized time-series data are divided into a plurality of time windows, as in Step S130. A Fourier Transform is performed on a time window of the plurality of time windows for each antenna element of the plurality of antenna elements to generate a plurality of frequency domain vectors, as in Step S140. The plurality of antenna elements is divided into a plurality of largest aperture sub-arrays, each sub-array of the plurality of equal aperture sub-arrays including non-uniformly spaced antenna elements from the antenna array, as in Step S150. For example, an element array might be divided into 4 randomly selected sub-arrays, each containing a unique subset of elements 2 to M−1 of length M/4. All sub-arrays also contain 1 and M to maintain total aperture. The frequency domain vectors are compressive beamformed for the each sub-array to generate a plurality of bearing estimates corresponding to the plurality of sub-arrays, as in Step S160. The plurality of bearing estimates from the plurality of sub-arrays are sparsely combined to generate a plurality of frequency-specific bearing estimates, as in Step S170. The plurality of frequency-specific bearing estimates are incoherently averaged over a range of frequencies to generate a bearing for a bearing-time record, as in Step S180. The performing a Fourier Transform on a time window, the dividing the plurality of antenna elements, the compressive beamforming the frequency domain vectors, and the incoherently averaging the plurality of frequency-specific bearing estimates are repeated to generate a plurality of bearings for the bearing-timing record, as in Step S190. The plurality of bearings form an increment beamformer output. The increment beamformer output is displayed based on the bearing-timing record, as in Step S200. A plurality of increment beamformer output forms one time window in the bearing-time record. That is, in practice, bearing estimation for each time window is performed continuously while the antenna array is in service. Consecutive time windows are appended and displayed continuously, while the antenna array is in operation, to provide situational awareness. By way of example, a beamformer output display includes, for instance, 30 minutes worth of time windows in the y-axis and 180 angles in the x-axis. New bearingestimates for a time window are appended to the bottom of the y-axis and the oldest time window is deleted from the top of the plot, according to this example. The operator, using this example, sees a constant time window of 30 minutes and sees how targets have changed bearing and have increased in intensity over the course of 30 minutes.

Optionally, the plurality of largest aperture sub-arrays satisfy the Uniform Uncertainty Principle.

Optionally, compressive beamforming includes beamforming free of a standard covariance matrix or an estimated covariance matrix. Optionally, the beamforming free of a covariance matrix includes solving for a plurality of bearing angles using a standard l1 matrix inversion.

Optionally, solving for a plurality of bearing angles using an l1 inversion includes using a standard relaxation algorithm or a standard greedy algorithm. Examples of the standard relaxation algorithm include standard basis pursuit and FOCUSS algorithms. Examples of the standard greedy algorithm include standard random, stagewise, weak, relaxed, and pure orthogonal matching pursuit algorithms.

Optionally, beamforming free of a covariance matrix includes solving for a plurality of bearing angles using a standard l1 matrix inversion and a standard l2 matrix inversion.

Optionally, this method embodiment further includes tracking at least one target using the displayed beamformer output. Optionally, this method embodiment further includes classifying the at least one target, based on the beamformer output.

Optionally, the antenna array is a standard ship-towed horizontal array, a standard moored array, of standard conformal array, or a standard hull array.

Optionally, sparsely combining the plurality of bearing estimates for the plurality of sub-arrays includes selecting a plurality of minimum hearing estimates corresponding to a plurality of angles across a plurality of frequencies. In other words, bearing look direction estimates are made for each subarray at a given frequency and time window. The smallest estimated bearing (at each look direction) across the subarrays is picked as the official bearing estimate for a given frequency and time window. Then, the plurality of frequency-specific bearing estimates is incoherently averaged across frequencies to get a bearing estimate for that time window.

Another embodiment of the instant invention includes a method of passive target detection where the number of sources and their source signals are considered unknown in the presence of noise. A limited number of targets are assumed to be distributed in bearing (look angle). We wish to determine the bearing and magnitude of these sparse number sources. Our receiver consists of a linear array (either horizontal or vertical) that has arbitrary inter-element spacing. Let r be the vector of receive positions. The classical equation for a beamformer is $$A_{nm} = w_m e^{iksin(\Theta_n)r_m} \quad (1)$$

where A are the phase and amplitude weights calculated for any frequency f=kc/(2π), where c is the sound speed of the medium. The look directions, $\theta_n$, range from 0 to $\pi$ radians with $\pi/2$ being defined as broadside to the array. If so desired, the array may be shaded with w, e.g. hanning, hamming, or box car as illustrative standard windowing techniques. The discretized basis A is shown in Eq. 1. For an M element measured array, N look directions will be searched for in the beam domain.

Here we consider the apparently underdetermined problem where N>M. The sparsity solution x contains the angle and amplitude information of the K<M targets present and can be estimated by the following $l_1$ minimization problem:

$$\hat{x} = \mathrm{argmin} \|x\|_1, \text{ subject to } Ax = y \qquad (2)$$

where y is a vector of measurements $y = [y_1 \ldots y_M]^T$ and $\hat{x}$ is the solution of the unknown x.

Broadband estimation of an unknown source signal

In passive detection problems, usually the source function of the target of interest is considered unknown. Therefore, a coherent broadband A matrix cannot be constructed to search for the sparse look direction vector $\hat{x}$. One solution is to solve each frequency independently, and incoherently average the solutions producing as final beamformer output of $$\hat{x} = \Sigma_{j=1}^{J} |\hat{x}(f_j)|^2$$

for all J frequencies.

Rank and Stability

Most linear arrays have inter-element spacing designed for a specific frequency. When such an array is used at a lower-than-design frequency, A becomes ill-conditioned. Even in the case of an arbitrarily spaced array, the rank of A may be insufficient, leading to inversion instabilities. In order to improve the rank of A, yet retain potentially valuable data in y, the use of singular value decomposition ("SVD") to intelligently pre-condition the basis set and data is proposed.

By performing the SVD of A (where H indicates the conjugate transpose) we find;

$$USV^H x = y \qquad (3)$$

The diagonal of S contains the singular values of A. In this specification, all singular values less than $\frac{1}{100}$ of the maximum value are set to zero. Thus, the size of the A matrix will be reduced from N×M to N×P, when P is the number of retained singular values of S. After reducing the U and S matrix to their non-zero columns and rows ($\tilde{U}$ and $\tilde{S}$, respectively):

$$\tilde{U}^H \tilde{U} \tilde{S} V^H x = \tilde{U}^H y, \text{ or equivalently } \tilde{A}x = \tilde{y}, \qquad (4)$$

and the solution is $$\hat{x} = \mathrm{argmin}\|x\|_1, \text{ subject to } \tilde{A}x = \tilde{y} \qquad (5)$$

Thus, the $\tilde{A}$ matrix is ensured to have a stable condition number for inversion and all of the (redundant) data are maximally utilized. Additionally, reducing the sizes of A and y also has the effect of decreasing the computational time required for inversion results. The SVD can also generate orthonormality, and thereby improve the matrix, condition, though, in this case, the beam matrix A is normal as defined.

One aspect of this embodiment of the invention is coherently utilizing data subsets while preserving total look angles. An equally sampled array (as most are) does not satisfy the uniform uncertainty principle, which is an important convergence condition for compressive beamforming, One example would be randomly splitting the M receiver array into two subsets of size M/2. These compressive beamforming estimates of x are then sparsely combined, increasing the ratio of signal strength to noise and sidelobes, thus improving performance. This does not result in a loss of number of beam angles N. As mentioned before, compressive beamforming can solve for N>M look directions.

An embodiment of the invention comprises a computer program for passive target detection, which computer program embodies the functions, filters, or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

One of ordinary skill in the art will recognize that the methods, systems, and control laws discussed above with respect to passive target detection may be implemented in software as software modules or instructions, in hardware (e.g., a standard field-programmable gate array ("FPGA") or a standard application-specific integrated circuit ("ASIC"), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may he provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and/or data structures described herein may be connected directly or indirectly to each other in order to allow the flow of data needed for their operations. It is also noted that software instructions or as module can be implemented for example as a subroutine unit or code, or as a software function unit of code, or as an object (as in an object-oriented paradigm), or as an applet, or in as computer script language, or as another type of computer code or firmware. The software components and/or functionality may be located on a single device or distributed across multiple devices depending upon the situation at hand.

Systems and methods disclosed, herein may use data signals conveyed using networks (e.g., local area network, wide area network, internet, etc.), fiber optic medium, carrier waves, wireless networks, etc, for communication with one or more data processing devices. The data signals can carry an or all of the data disclosed herein that is provided to or from a device.

This written description sets forth the best mode of the invention and provides examples to describe the invention and to enable at person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope the following claims.

What is claimed as new and desired to be protected by Letters Patent of the United States is:

1. A method of antenna array processing in an underwater environment exhibiting non-uniform noise, the method comprising:
    providing an antenna array comprising a plurality of antenna elements, adjacent antenna elements of the plurality of antenna elements being uniformly spaced along the antenna array;
    recording time-series data from the plurality of antenna elements;
    digitizing the recorded time-series data;
    dividing the digitized time-series data into a plurality of time windows;
    performing a Fourier Transform on a time window of the plurality of time windows for each antenna element of the plurality of antenna elements to generate a plurality of frequency domain vectors;
    dividing the plurality of antenna elements into a plurality of largest aperture sub-arrays, each sub-array of the plurality of equal aperture sub-arrays comprising non-uniformly spaced antenna elements from the antenna array;
    compressive beamforming the frequency domain vectors for the each sub-array to generate a plurality of bearing estimates corresponding to the plurality of sub-arrays;
    sparsely combining the plurality of bearing estimates from the plurality of sub-arrays to generate a plurality of frequency-specific bearing estimates;
    incoherently averaging the plurality of frequency-specific bearing estimates over a range of frequencies to generate a bearing for a bearing-timing record;
    repeating the performing a Fourier Transform on a time window, the dividing the plurality of antenna elements, the compressive beamforming the frequency domain vectors, and the incoherently averaging the plurality of frequency-specific bearing estimates to generate a plurality of bearings for the bearing-timing record; and
    displaying an increment beamformer output based on the plurality of bearings for the bearing-timing record.

2. The method according to claim 1, wherein the plurality of largest aperture sub-arrays satisfy the Uniform Uncertainty Principle.

3. The method according to claim 1, wherein said compressive beamforming comprises beamforming free of a covariance matrix.

4. The method according to claim 3, wherein said beamforming free of a covariance matrix comprises solving for a plurality of bearing angles using an I1 matrix inversion.

5. The method according to claim 4, wherein said solving for a plurality of bearing angles using an I1 inversion comprises using one of a relaxation algorithm and a greedy algorithm.

6. The method according to claim 3, wherein said beamforming free of a covariance matrix comprises solving for a plurality of bearing angles using an I1 matrix inversion and an I2 matrix inversion.

7. The method according to claim 1, further comprising:
    tracking at least one target using the displayed beamformer output.

8. The method according to claim 5, further comprising:
    classifying the at least one target based on the beamformer output.

9. The method according to claim 1, wherein the antenna array is one of a ship-towed, horizontal array, a moored array, a conformal array, and a hull array.

10. The method according to claim 1, wherein said sparsely combining the plurality of bearing estimates for the plurality of sub-arrays comprises selecting a plurality of minimum bearing estimates corresponding to a plurality of angles across a plurality of frequencies.

11. A method of antenna array processing in an underwater environment exhibiting non-uniform noise, the method comprising:
    providing an antenna array comprising a plurality of antenna elements, adjacent antenna elements of the plurality of antenna elements being non-uniformly spaced along the antenna array;
    recording time-series data from the plurality of antenna elements;
    digitizing the recorded time-series data;
    dividing the digitized time-series data into a plurality of time windows;
    performing a Fourier Transform on a time window of the plurality of time windows for each antenna element of the plurality of antenna elements to generate a plurality of frequency domain vectors;
    dividing the plurality of antenna elements into a plurality of largest aperture sub-arrays, each sub-array of the plurality of equal aperture sub-arrays comprising non-uniformly spaced antenna elements from the antenna array;
    compressive beamforming the frequency domain vectors for the each sub-array to generate a plurality of bearing estimates corresponding to the plurality of sub-arrays;
    sparsely combining the plurality of hearing estimates for the plurality of sub-arrays generate a plurality of frequency-specific bearing estimates;
    incoherently averaging the plurality of frequency-specific bearing estimates over a range of frequencies to generate a bearing for a bearing-tinting record;
    repeating the performing a Fourier Transform on a time window, the dividing the plurality of antenna elements, the compressive beamforming the frequency domain vectors, and the incoherently averaging the plurality of frequency-specific bearing estimates to generate a plurality of bearings for the bearing-timing record; and
    displaying an increment beamformer output based on the plurality of bearings for the bearing-timing record.

12. The method according to claim 11, wherein the plurality of largest aperture sub-arrays satisfy the Uniform Uncertainty Principle.

13. The method according to claim 11, wherein said compressive beamforming comprises beamforming free of a covariance matrix.

14. The method according to claim 13, wherein said beamforming free of a covariance matrix comprises solving for a plurality of bearing angles sing an I1 matrix inversion.

15. The method according to claim 14, wherein said solving for a plurality of bearing angles using an I1 inversion comprises using one of a relaxation algorithm and a greedy algorithm.

16. The method according to claim 13, wherein said beamforming free of a covariance matrix comprises solving for a plurality of bearing angles using an I1 matrix inversion and an I2 matrix inversion.

17. The method according to claim 11, further comprising:
    tracking at least one target using the displayed beamformer output.

18. The method according to claim 17, further comprising:
   classifying the at least one target based on the beamformer output.

19. The method according to claim 11, wherein the antenna array is one of a ship-towed, horizontal array, a moored array, a conformal array, and a hull array.

20. The method according to claim 11, wherein said sparsely combining the plurality of bearing estimates for the plurality of sub-arrays comprises selecting a plurality of minimum bearing estimates corresponding to a plurality of angles across a plurality of frequencies.

* * * * *